US00RE45730E

(19) United States
(12) Reissued Patent
Brexel et al.

(10) Patent Number: US RE45,730 E
(45) Date of Reissued Patent: Oct. 6, 2015

(54) PROCESS FOR GENERATING PERSONALIZED DIGITAL DIRECTORY PAGES

(71) Applicants: Catherine Brexel, Meudon (FR); Nathalie Vivensang, Hendaye (FR)

(72) Inventors: Catherine Brexel, Meudon (FR); Nathalie Vivensang, Hendaye (FR)

(21) Appl. No.: 13/645,603

(22) Filed: Oct. 5, 2012

Related U.S. Patent Documents

Reissue of:
(64) Patent No.: 7,810,023
Issued: Oct. 5, 2010
Appl. No.: 11/352,161
Filed: Feb. 10, 2006

U.S. Applications:
(63) Continuation of application No. 10/422,469, filed on Apr. 24, 2003, now Pat. No. 7,020,646, which is a continuation of application No. PCT/FR01/03326, filed on Oct. 26, 2001.

(30) Foreign Application Priority Data

Oct. 27, 2000 (FR) ..... 00 13856

(51) Int. Cl.
*G06F 17/00* (2006.01)
*G06F 17/30* (2006.01)

(52) U.S. Cl.
CPC .... *G06F 17/30905* (2013.01); *G06F 17/30867* (2013.01)

(58) Field of Classification Search
USPC ..... 707/733, 751; 715/206, 207
See application file for complete search history.

(56) References Cited

U.S. PATENT DOCUMENTS 5,850,433 A 12/1998 Rondeau
5,940,834 A 8/1999 Pinard et al.

(Continued)

FOREIGN PATENT DOCUMENTS

EP 1030247 A2 8/2000
WO WO 00/55741 A1 9/2000
WO WO0005574 A1 9/2000

OTHER PUBLICATIONS

Keller, Richard M. et al., A Bookmarking Service For Organizing and Sharing URLS, Computer Networks and ISDN Systems, vol. 29, No. 8-13, (Jan. 9, 1997), pp. 1103-1114.

(Continued)

*Primary Examiner* — Sherief Badawi
*Assistant Examiner* — Christopher J Raab
(74) *Attorney, Agent, or Firm* — Fitch, Even, Tabin & Flannery LLP

(57) ABSTRACT

A process for generating personalized digital directory pages for display with a navigator program including a personalization step including recording in a temporary memory of a client station a digital file corresponding to an HTML page comprising hypertext links for access to other pages and descriptors associated with pictograms and proceeding to a display of the page on the client station, recording in a temporary memory of the client station at least one personalization file comprising a link identifier and at least one personalization descriptor selected by the user, transmitting the content of the temporary memory to the server, and recording in a server memory the personalization file data linked with the user identifier and the link identifier in question.

70 Claims, 2 Drawing Sheets

(56) References Cited

U.S. PATENT DOCUMENTS

| | | | | |
|---|---|---|---|---|
| 6,029,182 | A | 2/2000 | Nehab et al. | |
| 6,085,242 | A | 7/2000 | Chandra | |
| 6,199,082 | B1 | 3/2001 | Ferrel et al. | |
| 6,271,840 | B1 * | 8/2001 | Finseth et al. | 715/236 |
| 6,317,722 | B1 | 11/2001 | Jacobi et al. | |
| 6,362,840 | B1 | 3/2002 | Burg et al. | |
| 6,412,008 | B1 | 6/2002 | Fields et al. | |
| 6,498,987 | B1 | 12/2002 | Kelly et al. | |
| 6,516,337 | B1 | 2/2003 | Tripp et al. | |
| 6,628,940 | B1 * | 9/2003 | Henrick | 455/419 |
| 6,632,248 | B1 * | 10/2003 | Isaac et al. | 715/273 |
| 6,675,350 | B1 | 1/2004 | Abrams et al. | |
| 6,763,496 | B1 | 7/2004 | Hennings et al. | |
| 6,848,075 | B1 * | 1/2005 | Becker et al. | 715/205 |
| 6,853,982 | B2 | 2/2005 | Smith et al. | |
| 6,895,406 | B2 | 5/2005 | Fables et al. | |
| 6,990,653 | B1 | 1/2006 | Burd et al. | |
| 7,039,860 | B1 * | 5/2006 | Gautestad | 715/205 |
| 7,050,989 | B1 | 5/2006 | Hurt et al. | |
| 7,072,888 | B1 * | 7/2006 | Perkins | 707/733 |
| 7,076,743 | B2 * | 7/2006 | Ingram et al. | 715/854 |
| 7,120,897 | B2 | 10/2006 | Ebbo et al. | |
| 7,171,414 | B1 | 1/2007 | Nazem et al. | |
| 7,234,107 | B1 | 6/2007 | Aoki et al. | |
| 7,475,346 | B1 * | 1/2009 | Bullock et al. | 709/203 |
| 7,631,032 | B1 | 12/2009 | Refuah et al. | |
| 2001/0051978 | A1 | 12/2001 | Allen et al. | |
| 2002/0049713 | A1 * | 4/2002 | Khemlani et al. | 707/1 |
| 2002/0052890 | A1 * | 5/2002 | Ingram et al. | 707/500.1 |
| 2002/0078102 | A1 * | 6/2002 | Dutta | 707/526 |
| 2002/0138331 | A1 | 9/2002 | Hosea et al. | |
| 2002/0194267 | A1 * | 12/2002 | Flesner et al. | 709/203 |
| 2005/0171947 | A1 * | 8/2005 | Gautestad | 707/5 |
| 2006/0047651 | A1 * | 3/2006 | Milic-Frayling et al. | 707/5 |

OTHER PUBLICATIONS

Fox, Personalized Web sites in a jiffy. Linux Technology Center (Sep. 1, 2000), pp. 1-6.

Launch.com, accessed via Wayback Machine (Jul., Aug. 2000), pp. 1-21.

deja.com, accessed via Wayback Machine (Apr., May 2000), pp. 1-10.

"Deja News to terminate email trail" (May 4, 1999), accessed via http://news.cnetcom/Deja-News-to-terminate-email-trail/2100-1023_3-225397.html, pp. 1-4.

"Google Acquires Usenet Discussion Service and Significant Assets from Deja.com" (Feb. 12, 2002), accessed via http://googlepress.blogspot.com/2001/02/google-acquires-usenet-discussion.html, pp. 1-2.

Richard M. Keller et al., *A bookmarking service for organizing and sharing URLs,* Computer Networks and ISDN Systems, vol. 29, No. 8-13, Sep. 1, 1997, pp. 1103-1114.

* cited by examiner

PROCESS FOR GENERATING PERSONALIZED DIGITAL DIRECTORY PAGES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION

This is a continuation of U.S. Ser. No. 10/422,469, filed Apr. 24, 2003, which is a continuation of International Application No. PCT/FR01/03326, with an international filing date of Oct. 26, 2001, which is based on French Patent Application No. 00/13856, filed Oct. 27, 2000.

FIELD OF THE INVENTION

This invention pertains to an interactive personal directory constituted in the form of digital pages transmitted by a server to a client station connected to the Internet or to a telecommunications network.

BACKGROUND

Known in the state of the art are various patents pertaining to processes for generating directory pages.

As an example, WO 00/55741 pertains to a system and management and link classification process (also called URL, or Uniform Resource Locator) which enables creation of public and personal repertoires of these links with the goal of improving Internet navigability. In various forms of implementation, that system stores Web links for multiple users in a database and provides processes for the extraction and posting of these Web links, processes for searching for Web links that are linked to existing links that a user stored in the system, as well as other associated characteristics. The users can organize and manage the link collections and search for related links in the link collections of other users. The characteristic criteria for database correspondence can use other information to search for relationships such as the user profile information comprising, e.g., age, sex and type of professional activity.

The article "A bookmarking service for organizing and sharing URLs" published in "Computer Networks and ISDN Systems", North Holland Publishing, Amsterdam, Vol. 29, No. 8-13 of Sep. 1, 1997, describes another solution for constituting a collection of links and personalizing this collection.

It would therefore be advantageous to enable each user connected to a page server via a network of the Internet or intranet type to personalize a directory in an interactive manner by associating personal descriptors with the proposed sites.

SUMMARY OF THE INVENTION

This invention relates to a process for generating personalized digital directory pages for display with a navigator program including a personalization step including recording in a temporary memory of a client station a digital file corresponding to an HTML page including hypertext links for access to other pages and descriptors associated with pictograms and proceeding to a display of the page on the client station, recording in a temporary memory of the client station at least one personalization file including a link identifier and at least one personalization descriptor selected by the user, transmitting the content of the temporary memory to the server, and recording in a server memory the personalization file data linked with the user identifier and the link identifier in question.

BRIEF DESCRIPTION OF THE DRAWINGS

Better comprehension of the invention will be obtained from the description below of a nonlimitative example of implementation with reference to the attached drawings in which.

DETAILED DESCRIPTION

Figure 1:
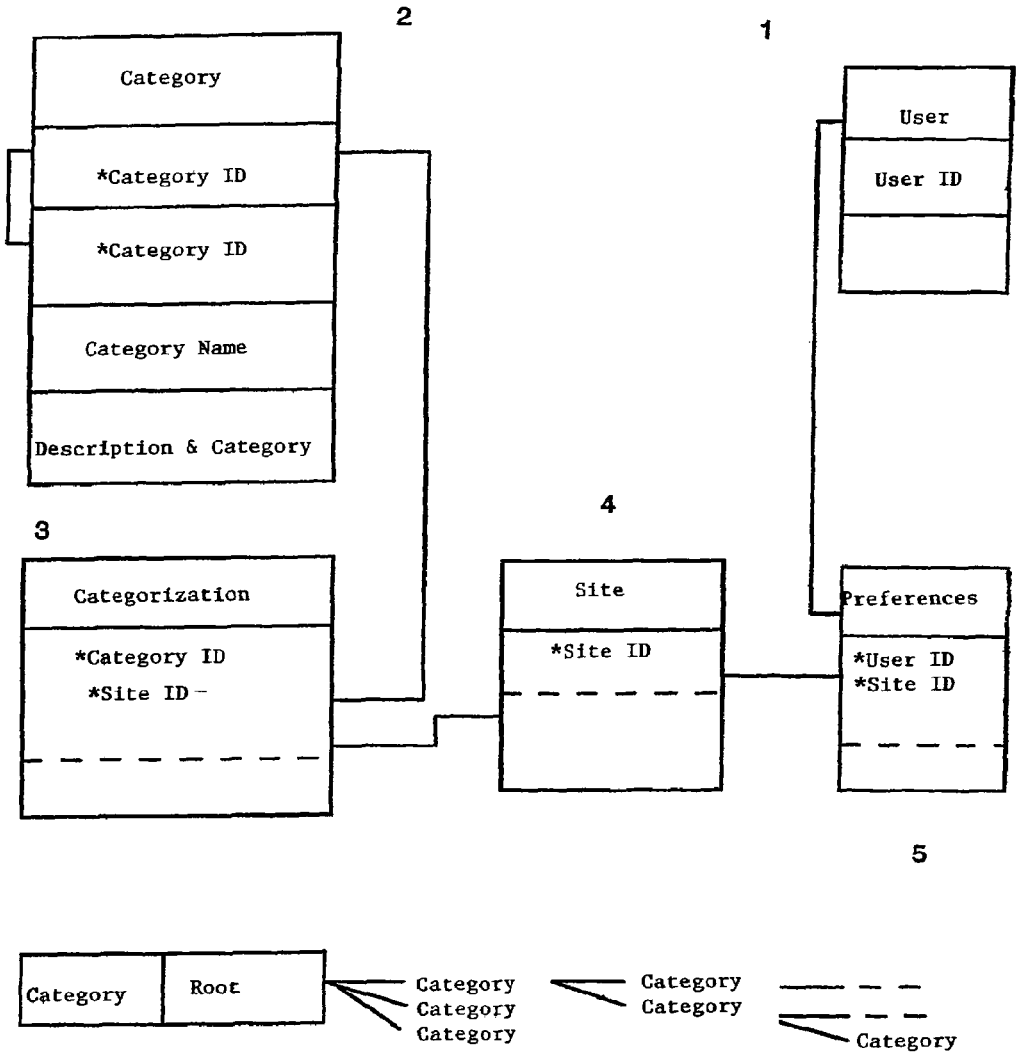
FIG. 1 schematically represents the architecture of the server.

The invention provides greater comfort and freedom for the internaut by allowing management of successive navigations and to modify and enrich the content of the lists that are offered.

For this purpose, the invention pertains in its broadest sense to a process for generating personalized digital directory pages intended to be displayed with a navigator type program, comprises a personalization step:

recording in a temporary memory of a client station a digital file corresponding to an HTML page comprising hypertext links for access to other pages as well as descriptors associated with pictograms and proceeding to the display of the page on the client station, recording in a temporary memory of the client station at least one personalization file comprising a link identifier and at least one personalization descriptor selected by the user, transmitting the content of the temporary memory to the server, and recording in the server memory the personalization file data linked with the user identifier and the link identifier in question.

According to a preferred mode of implementation, there is recorded in a server memory a first database of users comprising for each user a unique identifier and at least one associated user descriptor, a second database of sites comprising for each site a unique identifier and an address, a third table of site categories comprising for each category a unique identifier and a multiplicity of site identifiers, and a fourth database of descriptors comprising a unique identifier for each descriptor and a multiplicity of site identifiers and user identifiers, with a request stemming from a client station comprising a category identifier and the user identifier, and causing generation of a file comprising the site identifiers associated with the category identifier transmitted by the client station, and for each of the site identifiers the category identifier corresponding to the site identifier and the user identifier in question.

The selection of the descriptor by the user is advantageously performed by the designation of one of the pictograms displayed on the directory page, the recording of the identity of the displayed pictogram descriptor, by the designation of the site and the transmission by the client station to the server of a digital file comprising pairs formed by at least one category descriptor and a site identifier.

According to another aspect, the page display means comprise a filter enabling selection of the identifiers of the sites to be displayed as a function of the associated personal descriptor value.

According to yet another aspect, the process comprises a step of selecting sites to be deleted including selecting a deletion pictogram, selecting one or more site identifiers, and assigning a predefined value to the descriptor corresponding to each of the selected sites, then transmitting this information to the server for the recording in the descriptor database of the value in relation with the sites to be deleted.

These sites are in fact only deleted from the displayed list. They can be reactivated by a subsequent operation.

The process advantageously comprises a step for the addition of sites to a category including selecting a site identifier and assigning to it a value corresponding to an existing category, then transmitting said information to the server and recording in the category database the identifier of the selected site.

This operation can be performed by an action on a "copy" pictogram associated with a link to an application performing the operations in question and designating the destination (category). It also enables adding a site which is not in the database and adding it to a category by means of a form to be filled out.

According to another aspect, the process comprises recording on the server new categories of sites specific to a user or to a user community.

Turning now to FIG. 1, the server comprises a set of tables:

a table (1) of "users" in which are recorded for each user a unique identifier $ID_{ut}$ as well as the user's personal data;

a table (2) of "categories" in which are recorded for each category or family of sites a unique identifier $ID_{cat}$ as well as a text or graphical designation of the category, a description and optionally a unique identifier $ID_{cm}$ corresponding to a class of categories that groups together multiple categories;

a table (3) containing the identifiers of categories and sites belonging to that category;

a table (4) of "sites" containing unique identifiers of sites $ID_{site}$ and the IP address of the site as well as optionally a descriptor of the site;

a table (5) of "preferences" in which are recorded for each user and each site a preference indicator.

Figure 2:
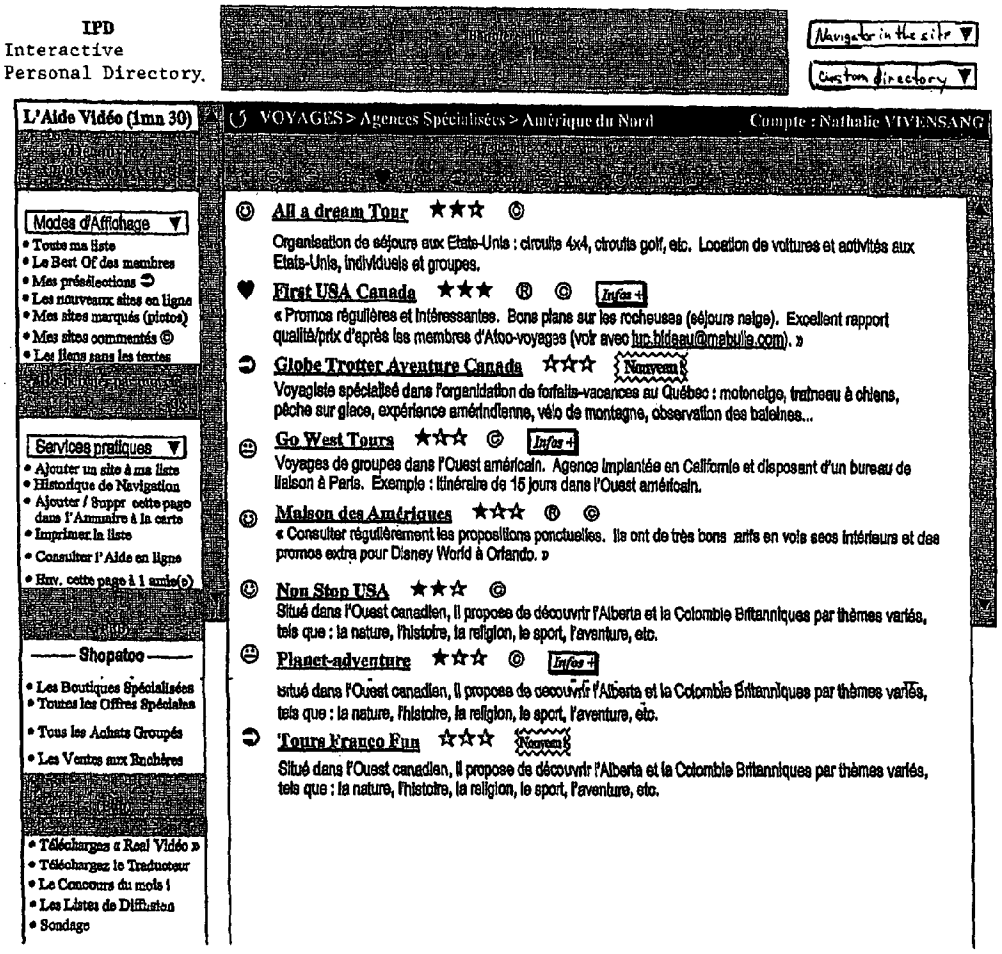
FIG. 2 represents a view of the display generated by the process according to the invention.

The preference indicator is modified by the user from a client station. The internaut selects a category of sites by sending a request constructed by the selection of a hypertext link displayed on the computer screen and the recording of an identifier associated with this hypertext link, and transmitting it to the server in the form of a digital file containing the selected category identifier as well as a user identifier. In return, the server sends a file containing the information associated with the category identifier and the list of sites associated with this category identifier as well as the preference indicators if such exist. This file is used by a navigator to produce a screen such as is represented in FIG. 2.

The user has available a collection of pictograms that can be selected for annotating a site appearing on the list. The pictogram "to visit" enables preselecting sites that the internaut wants to visit subsequently.

The pictogram "remove" allows removal of a pictogram appearing in relation with a listed site by superposition with the existing pictogram. The pictogram "preloading" enables the command to preload the site. It is associated with a computer procedure commanding the appearance of a clickable icon for opening a window with the HTML page loaded in cache memory. The computer procedure moreover causes modification of the appearance of the pictogram as a function of the preloading status (in the process of loading in the cache memory, preloaded and immediately displayable, or already displayed during the session).

The "smileys" pictograms allow annotation regarding the interest level of a site.

The "comment" pictogram enables recording of a comment related to a site. This function also allows replacement of the summary proposed by the "site" table with a personal comment recorded in the "preferences" table.

The sites bearing comments are presented in relation with a clickable pictogram enabling display alternatively of the personal comment or the public summary. Recording the personal comment can optionally be supplemented by the recording of information for the display solely of the personal comment or of the personal comment accompanied by the public summary, or of a clickable icon enabling switching back and forth between the two types of comments.

The "vote" pictogram allows associating with the site an indicator common to multiple users, making it appear in the "best of" or the preferred sites of an internaut community.

The display also has additional functions such as:

a list of short cuts enabling direct access to preferred pages, a history storing in memory and displaying the list of recently visited sites, an add function for adding sites from other lists. This function can include adding a site created by the internaut.

Another function is the personalized management of favorite sites. This function includes recording in a table the identifiers of sites preselected by the user, and of creating in the welcome page a list of the preselected sites to enable rapid access to these sites by a hypertext link. Favorite sites are designated by the attribution of a pictogram which, in addition to adding a visible mark in the margins of the designated sites, also automatically integrates them in the list of favorite sites.

Another function includes recording in a category table a personal category in which the user can register selected or created sites constituting a directory corresponding to these personal interest centers.

Another function includes assigning to selected sites a "to visit" icon enabling filtering the display of the directory page so as to optionally display only the sites bearing this indicator in the corresponding table associated with the user.

The HTML page optionally comprises a library of unassigned pictograms enabling modification of the graphical form of the standard pictograms or the creation of additional functions. This library can be displayed in an additional window or in part of the principal window.

The invention is described above as a nonlimitative example.

The invention claimed is:

1. A process for generating personalized digital directory pages comprising:

providing at least one computing device comprising a memory for storing instructions and a processor for executing said instructions, and utilizing said at least one computing device to perform the steps of:

a. requesting and receiving an HTML page related to a user search related link on a server from a client station, the HTML page comprising a plurality of hypertext links for access to other pages associated with the user search related link;

b. receiving and storing a digital file from said server in a temporary memory of the client station, said digital file corresponding to said HTML page and comprising said hypertext links for access to said other pages associated with the user search related link;

c. displaying said digital file on the client station and, based on user selection, recording a personalization file in said temporary memory, said personalization file comprising, for each of one or more hypertext links from said digital file, at least a selected identifier of a hypertext link and a corresponding selected personalization indicator for said hypertext link, wherein each selected identifier and corresponding selected personalization indicator, represents user preference with respect to the associated hypertext link, wherein said user is not required to visit said hypertext link;

d. transmitting said personalization file from the temporary memory to the server and recording therein, for each of one or more hypertext links from said digital file, said selected identifier of a hypertext link and said corresponding selected personalization indicator, linked with a user identifier, for subsequent access.

2. The process according to claim 1, wherein:

a. comprises:

a1. requesting an HTML page on a server from a client station, the request comprising a user identifier; and b. comprises:

b1. receiving a digital file from said server, said digital file corresponding to said HTML page and comprising hypertext links for access to other pages and personalization indicators associated with hypertext links based on said user identifier, and b2. storing said digital file in a temporary memory of the client station.

3. The process according to claim 1, wherein:

c. comprises:

c1. displaying personalization pictograms with said digital file, each such pictogram being associated with a personalization indicator, c2. selecting a personalization indicator and an identifier of an hypertext link based on the user association of the corresponding personalization pictogram and the corresponding hypertext link, and c3. recording said selected identifier of a hypertext link and the corresponding selected personalization indicator in said personalization file.

4. The process according to claim 1, wherein c. comprises recording, based on user selection, a personalization attribute of a selected hypertext link in the personalization file in said temporary memory, said personalization attribute being associated with an identifier of the selected hypertext link in said personalization file.

5. The process according to claim 4, wherein said personalization attribute is user defined text information.

6. The process according to claim 4, wherein said personalization attribute is a category having a category identifier associated with an identifier of the selected hypertext link in said personalization file.

7. The process according to claim 1, wherein c. comprises updating display of said digital file upon a user selection defining a rule.

8. The process according to claim 7, wherein said rule comprises displaying only those hypertext links within said digital file associated with a user selected personalization indicator upon said user selection.

9. The process according to claim 1, further comprising:

e. storing said selected identifier of a hypertext link, said corresponding selected personalization indicator and said user identifier in at least one database recorded in a server memory.

10. The process according to claim 9, wherein:

e. comprises:

e1. storing said selected identifier of a hypertext link, said corresponding selected personalization indicator and said user identifier in a table of said database, said table comprising records each containing triplets designating a user identifier, a hypertext link identifier and a personalization indicator.

11. The process according to claim 9, wherein said database comprises:

a first table comprising records, each containing couples designating a hypertext link identifier and a hypertext link address;

a second table comprising records, each containing couples designating a user identifier and user information; and a third table comprising records, each containing triplets designating a user identifier, a hypertext link identifier and a personalization indicator.

12. The process according to claim 11, wherein said database further comprises:

a fourth table comprising records, each containing a personalization attribute identifier and a personalization attribute content; and a fifth table comprising records, each containing a personalization attribute identifier and a hypertext link identifier.

13. The process according to claim 1, wherein said personalization indicator comprises at least one of an indicator selected from the group consisting of a deletion indicator, a favorite indicator and a pre-loading indicator.

*14. A process for generating personalized digital directory pages comprising:*

*providing at least one server comprising a memory for storing instructions and a processor for executing said instructions, said server configured to perform the steps of:*

*a. receiving a request for an HTML page related to a user search related link, the HTML page comprising a plurality of hypertext links for access to other pages associated with the user search related link;*

*b. generating and transmitting a digital file corresponding to said HTML page and comprising said hypertext links for access to said other pages associated with the user search related link; and*

*c. receiving and recording a personalization file based on user selection, linked with a user identifier, said personalization file comprising, for each of one or more hypertext links from said digital file, at least a selected identifier of a hypertext link and a corresponding selected personalization indicator for said hypertext link, wherein each selected identifier and corresponding selected personalization indicator represents user preference with respect to the associated hypertext link, and wherein there is no requirement to visit said hypertext link.*

*15. The process according to claim 14, wherein:*

*a. comprises:*

*a1. receiving a request for an HTML page, the request comprising a user identifier; and*

*b. comprises:*

*b1. transmitting a digital file, said digital file corresponding to said HTML page and comprising hypertext links for access to other pages and personalization indicators associated with hypertext links based on said user identifier.*

*16. The process according to claim 14, further comprising:*

*d. storing said selected identifier of a hypertext link, said corresponding selected personalization indicator and said user identifier in at least one database recorded in a server memory.*

*17. The process according to claim 16, wherein:*

*d. comprises:*

*d1. storing said selected identifier of a hypertext link, said corresponding selected personalization indicator and said user identifier in a table of said database, said table comprising records each containing triplets designating a user identifier, a hypertext link identifier and a personalization indicator.*

*18. The process according to claim 16, wherein said database comprises: a first table comprising records, each containing couples designating a hypertext link identifier and a hypertext link address,*

*a second table comprising records, each containing couples designating a user identifier and user information: and*

*a third table comprising records, each containing triplets designating a user identifier, a hypertext link identifier and a personalization indicator.*

*19. The process according to claim 18, wherein said database further comprises: a fourth table comprising records, each containing a personalization attribute identifier and a personalization attribute content; and*

*a fifth table comprising records, each containing a personalization attribute identifier and a hypertext link identifier.*

*20. The process according to claim 14, wherein said personalization indicator comprises at least one of an indicator selected from the group consisting of a deletion indicator, a favorite indicator and a pre-loading indicator.*

*21. A system comprising:*

*at least one server comprising a memory for storing instructions and a processor for executing said instructions, said server configured to:*

*a. receive a request for an HTML page related to a user search related link, the HTML page comprising a plurality of hypertext links for access to other pages associated with the user search related link;*

*b, generate and transmit a digital file corresponding to said HTML page and comprising said hypertext links for access to said other pages associated with the user search related link; and*

*c. receive and record a personalization file based on user selection, linked with a user identifier, said personalization file comprising, for each of one or more hypertext links from said digital file, at least a selected identifier of a hypertext link and a corresponding selected personalization indicator for said hypertext link, wherein each selected identifier and corresponding selected personalization indicator represents user preference with respect to the associated hypertext link, and wherein there is no requirement to visit said hypertext link.*

*22. The system according to claim 21, wherein said server is further configured to:*

*a1. receive a request for an HTML page, the request comprising a user identifier, and*

*b1. transmit a digital file, said digital file corresponding to said HTML page and comprising hypertext links for access to other pages and personalization indicators associated with hypertext links based on said user identifier.*

*23. The system according to claim 21, wherein said server comprises at least one*

*database recorded in the server memory, said server being further configured to:*

*d. store said selected identifier of a hypertext link, said corresponding selected personalization indicator and said user identifier in said database.*

*24. The system according to claim 23, wherein said server is further configured to:*

*d1. store said selected identifier of a hypertext link, said corresponding selected personalization indicator and said user identifier in a table of said database, said table comprising records each containing triplets designating a user identifier, a hypertext link identifier and a personalization indicator.*

*25. The system according to claim 23, wherein said database comprises: a first table comprising records, each containing couples designating a hypertext link identifier and a hypertext link address;*

*a second table comprising records, each containing couples designating a user identifier and user information; and*

*a third table comprising records, each containing triplets designating a user identifier, a hypertext link identifier and a personalization indicator.*

*26. The system according to claim 25, wherein said database further comprises: a fourth table comprising records, each containing a personalization attribute identifier and a personalization attribute content; and*

*a fifth table comprising records, each containing a personalization attribute identifier and a hypertext link identifier.*

*27. The system according to claim 21, wherein said personalization indicator comprises at least one of an indicator selected from the group consisting of a deletion indicator, a favorite indicator and a pre-loading indicator.*

*28. A process for generating personalized digital directory pages, comprising: providing a computer comprising a memory for storing instructions and a processor for executing the instructions, the computer configured to perform operations including:*

*receiving an HTML page related to a user search related link, the HTML page comprising a plurality of hypertext links for access to other pages associated with the user search related link, the HTML page being used to generate and transmit a corresponding digital file comprising the plurality of hypertext links for access to the other pages associated with the user search related link, a personalization file being received and recorded based on user selection and comprising, for each of at least one of the plurality of hypertext links from the digital file, at least a selected identifier of a hypertext link and a corresponding selected personalization indicator for the hypertext link, wherein each selected identifier and corresponding selected personalization indicator represents user preference with respect to the associated hypertext link, and wherein there is no requirement to visit the hypertext link.*

*29. The process according to claim 28,*

*wherein receiving an HTML page related to a user search related link comprises receiving a request for an HTML page, the request comprising a user identifier, and*

*wherein the corresponding digital file comprises hypertext links for access to other pages and personalization indicators associated with hypertext links based on the user identifier.*

*30. The process according to claim 28,*

*wherein the selected identifier of a hypertext link, the corresponding selected personalization indicator and the user identifier are stored in at least one database recorded in a server memory.*

*31. The process according to claim 14, wherein the user search related link is associated with a category identifier that corresponds to a category of HTML pages to be searched, and the plurality of hypertext links in the HTML page correspond to other pages associated with the category identifier.*

*32. The process according to claim 14 wherein the hypertext link, the corresponding selected personalization indicator, and the user identifier are stored in a linked data structure in a server memory.*

*33. The process according to claim 14,*

*wherein the user search related link is associated with a category identifier that corresponds to a category of HTML pages to be searched, and the plurality of hypertext links in the HTML page correspond to other pages associated with the category identifier;*

*and wherein the hypertext link, the corresponding selected personalization indicator, and the user identifier are stored in a linked data structure in a server memory.*

*34. The process of claim 14, wherein the personalization indicator relates to user input received reflecting a user's vote regarding a site.*

*35. The process of claim 14, wherein the personalization indicator relates to user input received reflecting a user's interest in a site.*

*36. The process of claim 14, wherein the personalization indicator relates to user input received reflecting a user's desire to subsequently visit a site.*

*37. The process of claim 14, wherein the personalization indicator relates to user input received reflecting a user's personal comment regarding a site.*

*38. The process of claim 14, wherein the personalization indicator relates to user input received reflecting a user's selection of a site to be included in a subsequently displayed list of sites.*

*39. The process of claim 14, wherein the personalization indicator relates to user input received reflecting a user's selection of a site to be omitted from a subsequent displayed list of sites.*

*40. The process of claim 14, wherein the personalization indicator relates to user input received reflecting a user's assignment of a site to category of sites.*

*41. The system of claim 21 wherein the user search related link is associated with a category identifier that corresponds to a category of HTML pages to be searched, and the plurality of hypertext links in the HTML page correspond to other pages associated with the category identifier.*

*42. The system of claim 21 wherein the hypertext link, the corresponding selected personalization indicator, and the user identifier are stored in a linked data structure in a server memory.*

*43. The system of claim 21,*

*wherein the user search related link is associated with a category identifier that corresponds to a category of HTML pages to be searched, and the plurality of hypertext links in the HTML page correspond to other pages associated with the category identifier;*

*and wherein the hypertext link, the corresponding selected personalization indicator, and the user identifier are stored in a linked data structure in a server memory.*

*44. The system of claim 21 wherein the personalization indicator relates to user input received reflecting a user's vote regarding a site.*

*45. The system of claim 21, wherein the personalization indicator relates to user input received reflecting a user's interest in a site.*

*46. The system of claim 21, wherein the personalization indicator relates to user input received reflecting a user's desire to subsequently visit a site.*

*47. The system of claim 21, wherein the personalization indicator relates to user input received reflecting a user's personal comment regarding a site.*

*48. The system of claim 21, wherein the personalization indicator relates to user input received reflecting a user's selection of a site to be included in a subsequently displayed list of sites.*

*49. The system of claim 21, wherein the personalization indicator relates to user input received reflecting a user's selection of a site to be omitted from a subsequent displayed list of sites.*

*50. The system of claim 21, wherein the personalization indicator relates to user input received reflecting a user's assignment of a site to category of sites.*

*51. A system for creating personalized digital directory pages from web search results for multiple users accessing the system through respective client computing devices over a network, the system comprising:*

*at least one server accessible by client computing devices via the network and comprising at least one processor and at least one memory, and being programmed, via executable program instructions;*

*the at least one server configured to: (i) receive user supplied search requests from each of multiple users; (ii) in response to each search request, provide for display on a client computing device to the requesting user digital information corresponding to at least one web page associated with the search request and comprising a plurality of links for access to other web pages associated with the search request; (iii) receive user supplied personalization information from the respective client computing devices of each of multiple users, the personalization information associating at least one personalization descriptor with at least one link previously provided in response to a search request of the user regardless of whether the user has visited the web page associated with the link;*

*wherein the at least one server is in communication with a data storage and configured to cause the recording in the data storage, for each of multiple users, of an association between at least one personalization descriptor and at least one of the links as specified in the personalization information supplied by the user; and*

*wherein the at least one server is configured to provide for display on a client computing device to a user, in response to a subsequent request by the user, digital information corresponding to a personalized digital directory page comprising a plurality of links relating to the subsequent request and the personalization descriptors the requesting user previously associated with any of the provided links as recorded in the data storage.*

*52. The system of claim 51, wherein the at least one server is configured to provide for display on a client computing device to a user, a plurality of category links, each category link associated with a category of web pages and being selectable by the user to initiate a search request comprising a category identifier corresponding to a selected category link.*

*53. The system of claim 52, wherein the at least one server is configured to provide, in response to receiving the user supplied search request comprising the category identifier,*

*digital information corresponding to a web page comprising a plurality of links for access to other web pages associated with the category identifier.*

*54. The system of claim 52, wherein the at least one server is configured to provide a text or graphical designation of the category for display with each category link.*

*55. The system of claim 51, wherein the at least server is configured to receive user input assigning a category identifier to at least one link and to cause the recording of an association between the at least one link and the category identifier in the data storage.*

*56. The system of claim 51, wherein at least one personalization descriptor represents user preference with respect to a link.*

*57. The system of claim 51, wherein the at least one server is configured to provide for display on a client computing device to a user, digital information corresponding to a personalized digital directory page comprising the links that the user previously associated with a particular personalization descriptor as recorded in the data storage.*

*58. The system of claim 51, wherein the at least one server is configured to provide for display on a client computing device to a user, at least one pictogram, each pictogram corresponding to a personalization descriptor and being user selectable for associating the pictogram for display with a displayed link.*

*59. The system of claim 58, wherein the at least one server is configured to receive user input specifying the removal of a pictogram previously displayed in relation to a displayed link of a personalized digital directory page.*

*60. The system of claim 58, wherein the at least one pictogram includes a pictogram allowing a user to designate a link to be deleted from a displayed list of links.*

*61. The system of claim 58, wherein the at least one pictogram includes a pictogram reflecting a user's desire to subsequently visit a web page.*

*62. The system of claim 58, wherein the at least one pictogram includes a pictogram reflecting a user's interest level in a displayed link.*

*63. The system of claim 58, wherein the at least one pictogram includes a pictogram allowing a user to associate a personal comment with a displayed link.*

*64. The system of claim 58, wherein the at least one pictogram includes a pictogram allowing a user to associate a rating with a displayed link.*

*65. The system of claim 58, wherein the at least one pictogram includes a pictogram allowing a user to associate a vote with a displayed link reflecting the user's endorsement of a web page associated with the link to other users of the system.*

*66. The system of claim 58, wherein the at least one server is configured to receive and record personal descriptors reflecting votes of multiple users associated with a link, and, based on the votes, to provide for display with the link an indication endorsing a web page associated with the link as a preferred web page to users of the system.*

*67. The system of claim 66, wherein the at least one server is configured to provide for display on a client computing device to a user digital information corresponding to a personalized digital directory page comprising the links as to which the user previously associated a vote.*

*68. The system of claim 58, wherein the at least one pictogram includes a favorites pictogram allowing a user to designate a displayed link as corresponding to a favorite web page of the user.*

*69. The system of claim 68, wherein the at least on server is configured to provide for display on a client computing device to a user a list of links as to which the user previously associated the favorites pictogram.*

*70. The system of claim 51, wherein the at least one server is configured to allow each user of the system to create and subsequently access personalized digital directory pages reflecting the user's preferences regarding various links independent of any personalization descriptors that other users of the system have associated with the links.*

* * * * *